United States Patent [19]

Heatherington

[11] 4,374,411

[45] Feb. 15, 1983

[54] RELOCATABLE READ ONLY MEMORY

[75] Inventor: Dale A. Heatherington, Decatur, Ga.

[73] Assignee: Hayes Microcomputer Products, Inc., Atlanta, Ga.

[21] Appl. No.: 121,450

[22] Filed: Feb. 14, 1980

[51] Int. Cl.³ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,681,757 | 8/1972 | Allen et al. | 364/200 |
| 3,781,826 | 12/1973 | Beausoleil | 364/200 X |
| 3,959,783 | 5/1976 | Fressineau et al. | 364/200 X |
| 3,980,991 | 9/1976 | Mercurio | 364/200 |
| 4,038,645 | 7/1977 | Birney et al. | 364/200 |
| 4,051,460 | 9/1977 | Yamada et al. | 364/900 |
| 4,121,286 | 10/1978 | Venton et al. | 364/200 |

OTHER PUBLICATIONS

"Kilobaud: *Hardware Program Relocation-The Way Biggies Do It*", Dr. Michael Wingfield, The Small Computer Magazine, Jan. 1978, Issue No. 13, pp. 60–62.
*Computer Dictionary & Handbook*, Sippl & Sippl, Howard W. Sams & Co., Inc., Third Edition, 1980, Preface and pp. 136, 340, 278, 279, 336 & 337.

*Primary Examiner*—Harvey E. Springborn
*Attorney, Agent, or Firm*—Jones & Askew

[57] ABSTRACT

A read only memory apparatus for use in a byte oriented processor (10) includes a data selector (25) which responds to the first memory fetch of a memory reference instruction (40, 28) to provide a selected set of output bits (20) from a read only memory to a particular portion (22) of the processor data bus. The apparatus provides a set of replacement bits (26) to the same portion of the data bus (22) in response to each occurrence of detection (29, 30') of the most significant byte of a such memory reference instruction being provided to the data bus. The replacement bits occur in the most significant byte of the address referred to in the memory reference instruction and prevents the processor's program counter from jumping out of the address space alloted to the read only memory. In the preferred form, the same set of switches (17) used with an address decoder (15) to define the location of the ROM circuit in the address space of the processor's memory also provides replacement bits.

6 Claims, 3 Drawing Figures

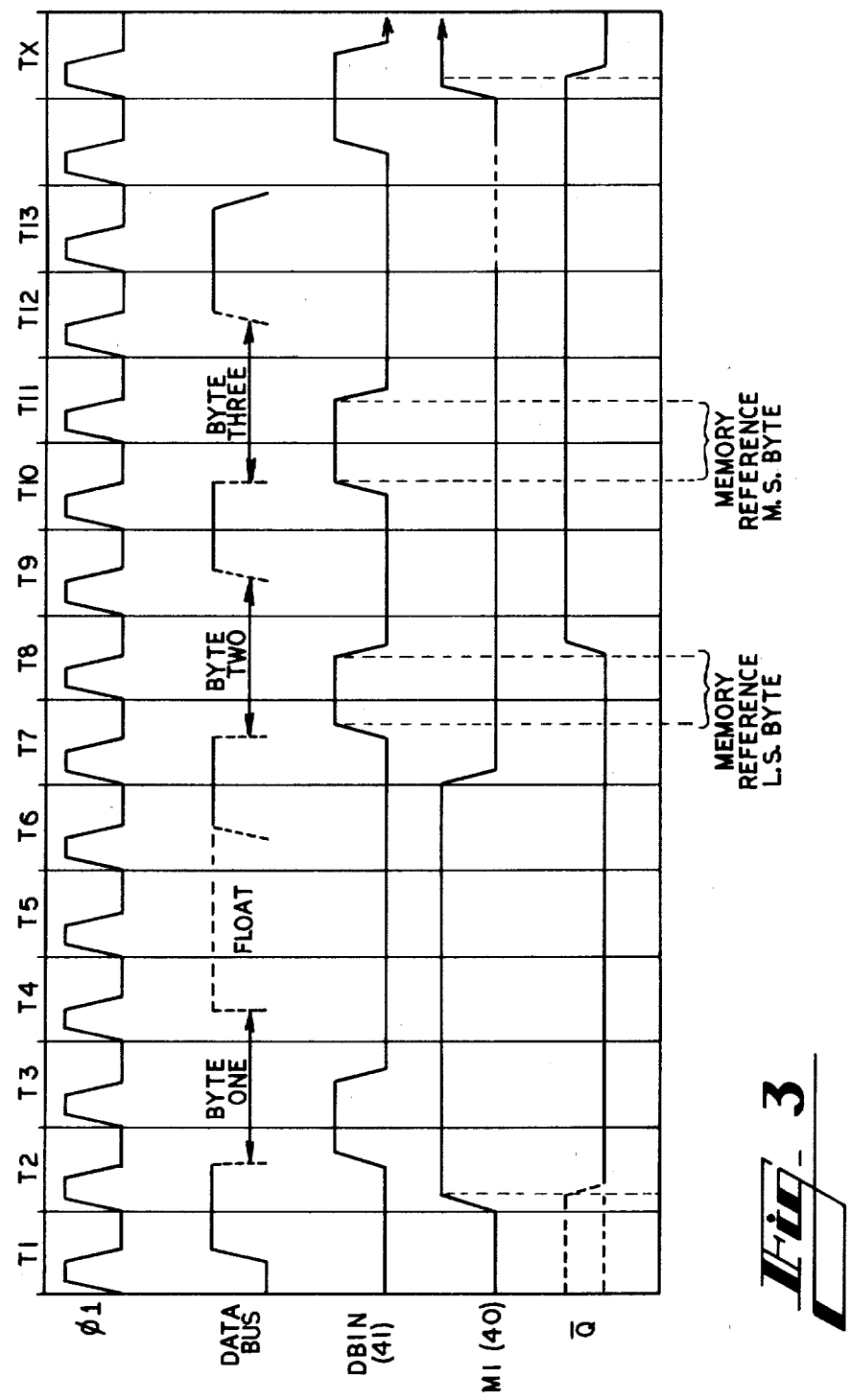

RELOCATABLE READ ONLY MEMORY

TECHNICAL FIELD

The present invention relates to computer memory apparatus and more specifically to read only memory devices for use with microprocessors and microcomputers.

BACKGROUND OF THE INVENTION

Since the early 1970s when the four-bit integrated circuit microprocessor was first introduced commercially, microprocessors and one chip microcomputers have fostered a virtual revolution in consumer electronic products. Currently microprocessors control a host of devices for which computer control would have been prohibitively expensive ten years ago.

In many consumer products and microprocessor based microcomputers a considerable amount of software is stored in read only memories (ROM)s.

In byte oriented computer processors, instructions containing memory addresses generally require several sequential fetches from memory. Most instructions containing memory references can be fetched from memory in one or two accesses (fetches), but in some microprocessors, memory reference instructions require three fetches from memory. The first fetch accesses the instruction byte which signifies the type of memory reference instruction. The second two bytes contain the two-byte address referenced in the memory reference instruction. A common format for such memory reference instructions places the most significant byte of the referenced memory address in the last byte fetched from memory.

Among currently available eight bit byte microprocessors for which three fetches are required for memory reference instructions and for which the most significant byte of a memory reference instruction is contained in the third fetch are the 8080 (Intel), 6502 (MOS Technology), and the Z-80 (Zilog).

As is known to those skilled in the art, standardized software may be most economically distributed for use in microprocessors via read only memories. The least expensive vehicle for propagating software directly usable by a microprocessor is the mass produced mask programmed read only memory. The economics of production of such read only memories come from the ability to produce large numbers of identical devices because there is a relatively large setup cost for producing a mask programmed ROM but the cost per unit manufactured decreases as the setup cost is distributed over a large number of units.

It will therefore be appreciated that in order to distribute general purpose software it is highly desirable to be able to use a generalized read only memory which may be inserted into any available microprocessor based system. Execution of instructions sequentially from a read only memory causes no problem. However, when memory reference instructions such as JUMP instructions are encountered, the address contained in the microprocessor program counter will be derived in whole or in part from data stored in the ROM. It will therefore be appreciated that in order to jump from one memory location to another within a ROM program, the microprocessor system must be designed to treat the address of the ROM in the same manner in which the memory reference instructions stored in the ROM treat its address. If this is not accomplished, a read only memory could provide a microprocessor with an instruction to jump to what the ROM program considered another address within the ROM, but due to the addressing scheme used in the microprocessor system, would cause the processor to fetch an instruction from an entirely unrelated memory location.

In the past it has been common to encounter ROM programs written with zero base addresses. However, if a user of a predesigned microprocessor system having a different ROM in the zero base address location wishes to use yet another zero base addressed ROM, the prior art has provided only relatively complex and expensive ways of modifying memory reference instructions contained within the second ROM in order to fit the addressing scheme of the preexisting system.

For example the prior art has included a scheme for writing program segments out of a read only memory into a random access memory and identifying portions of memory reference instructions, and using a combination of software and hardware to modify the address bytes in memory reference instructions. The main processor is then designed to execute instructions contained in the random access memory.

Another device has included a relatively complicated base address register and an adder for modifying the address supplied to the microprocessor program counter from memory reference instructions contained in a ROM.

The prior art has heretofore not provided a simple and inexpensive scheme of locating a ROM within the memory addressing scheme of a microprocessor based system so that memory reference instructions contained within the ROM will not cause the program counter to jump to an improper memory location and which also allows the ROM to be placed in different address locations within different microprocessor based systems without extensive modification to either hardware or ROM software.

SUMMARY OF THE INVENTION

The present invention overcomes the problems presented by the prior art of providing general purpose software in mask programmed read only memories which may be located at different addresses of a microprocessor based system. The invention disclosed herein allows the user to modify the address contained in a memory reference instruction (such as a JUMP instruction) using a set of switches which is also used to define the address of the particular read only memory by comparison to highest order bits from the system address bus.

It is an object of the present invention to provide a read only memory circuit which will modify only a preselected N set of bits from the most significant byte of a memory reference instruction from the read only memory and will otherwise leave the contents of the read only memory output unchanged.

It is a further object of the present invention to provide a read only memory circuit for which a signal source which defines the block of memory in which the ROM is located is also used as the signal source for the modification of the highest order bits of memory reference instructions.

It is still a further object of the present invention to provide a relocatable read only memory which may be placed in any desired block of a microprocessor system memory through the use of a minimal number of additional components. More specifically in microprocessor systems where address decoders are used to enable read only memory chips, it is an object of the present invention to provide a relocatable read only memory circuit with the addition of only a simple counter and a data selector.

Most generally described, the present invention is usable in any microprocessor based system wherein: (1) the microprocessor is characterized by an instruction set requiring M fetches from memory for a memory reference instruction; (2) the first memory fetch for any instruction is readily identifiable; (3) and the most significant byte of the address referenced in the memory reference instruction is contained in the final or Mth byte fetched.

The present invention generally locates the ROM in any desired portion of the address space by defining N replacement bits for memory reference instructions and providing these N bits in lieu of N bits contained in the Mth byte of the memory reference instruction whenever the invention detects the most significant byte of a memory reference instruction being provided from the ROM to the data bus. More specifically the disclosed embodiment uses a simple counter which resets upon each occurrence of the first fetch of any instruction from memory and which will substitute N predetermined replacement bits on the N most significant bits of the data bus whenever the counter counts that M memory fetches have occurred without the counter being reset.

A further advantage of the present invention is that many microprocessor systems already require the apparatus necessary to provide the N replacement bits. This apparatus is often embodied as N input bits to an address decoder which is used to define the block of memory in which the particular ROM circuit is located. With signals defining the block available, the present invention takes advantage of such systems by using the same signals which are inputs to the address decoder as the outputs to the data bus for N bits of the most significant byte of a memory reference instruction.

It will therefore be appreciated that the present invention provides an extremely simple and inexpensive way of locating generalized mass produced read only memory programs which may be located virtually anywhere within a microprocessor memory space. By observing a few straightforward programming rules the programmer may develop all purpose programs for a particular microprocessor, mass produce read only memories containing the programs using zero base addressing, and distribute the read only memories with the assurance that they may be used successfully in any system employing the microprocessor for which the program was written.

These and other objects of the present invention and advantages of the present invention over prior art read only memory circuits will become apparent from the detailed description to follow.

BRIEF DESCRIPTION OF THE DRAWINGS

FIG. 3 is a timing diagram showing several relevant waveforms within the preferred embodiment of FIG. 2.

DETAILED DESCRIPTION

As mentioned hereinabove the present invention is useful in any microprocessor system having an instruction set using memory reference instructions which are M bytes in length, and in which such instructions use the Mth byte as the most significant address byte of the memory reference. The present invention is most easily accomplished in systems in which the first memory fetch for any instruction is readily identifiable. For this type of byte oriented processor having L bit bytes, the present invention will substitute N bits (N being an integer greater than 0 and less or equal to L) of the most significant byte on the data bus when a memory reference instruction is being executed.

It will be appreciated by those skilled in the art that among currently available mircoprocessors meeting the foregoing criterion the type 8080, type 6502, and the Z80 fill all of these qualifications. The preferred embodiment disclosed herein shows, by way of example, a system using the Intel 8080 microprocessor. It will be appreciated by those skilled in the art that the 8080 microprocessor is a byte oriented processor having eight bit bytes and which are characterized by an instruction set requiring three memory fetches for memory reference instructions. It will therefore be appreciated that the preferred embodiment disclosed herein fits the generalized description set forth above wherein L equals eight and M equals three. As will be appreciated from the description to follow the four most significant address bits are used to define memory blocks in the example of the preferred embodiment and therefore N equals four.

Figure 1:
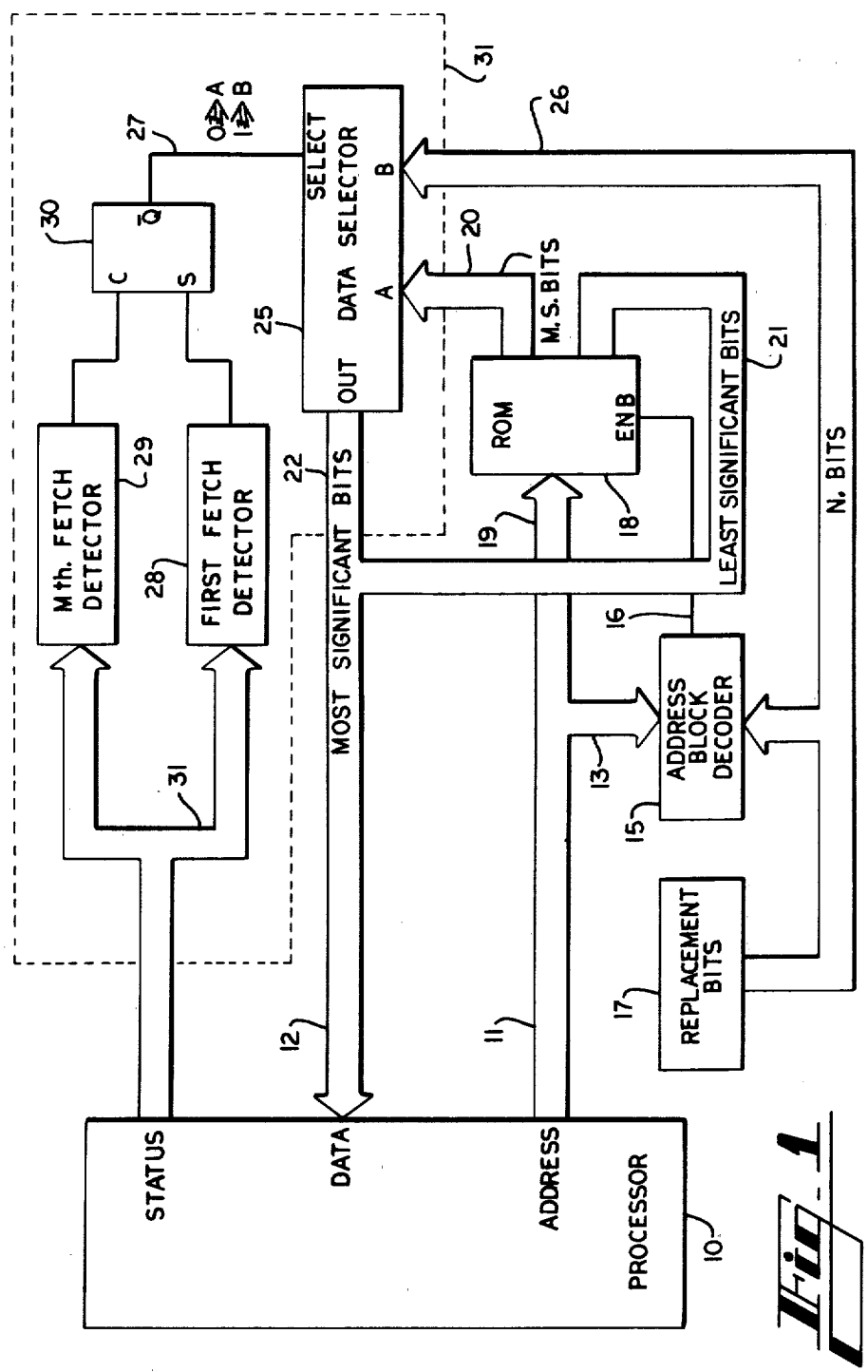
FIG. 1 is a block diagram of a microprocessor system embodying the present invention.

Turning first to FIG. 1 a block diagram of the preferred embodiment is shown so that the simplicity of the present invention may be readily appreciated. As may be seen in FIG. 1 a microprocessor 10 including an address bus 11 and a data bus 12 is the environment of the present invention. It is to be understood that a plurality of read only memory devices such as the type disclosed herein may be used in any microprocessor system and that other read only memories together with random access memories and other I/O devices will be attached to the address and data buses of processor 10.

An address block decoder 15 is connected to address bus 11 and provides an output on line 16 when the N most significant bits of address bus 11 compare on a one to one basis with N replacement bits from block 17. An output on line 16 enables read only memory 18. The least significant bits of the address bus 11 appear on a small address bus 19 to directly address a location in the enabled ROM. The output of ROM 18 is divided into its significant bits 20, and its least significant bits 21.

As may be seen from FIG. 1 the least significant bits 21 of the output of ROM 18 are provided directly to data bus 12 while the most significant bits 20 of the output of ROM 18 are provided to a data selector 25. The output of data selector 25 appears as a small bus 22 which contains the most significant bits of data bus 12. It will be be appreciated that data selector 25 will have three state outputs connected to bus 22 in order that the entirety of data bus 12 may be connected to other devices without being adversely affected by data selector 25.

The other input port to data selector 25 carries the N replacement bits from block 17 which appear on bus 26. Therefore, depending on the state of line 27 which is provided to the select input of data selector 25, either the most significant bits 20 from ROM 18 will be provided on output bus 22 or the replacement bits from bus 26 will be provided onto output bus 22. Line 27 is controlled by a generalized latch 30 shown as setting when an output is received from first fetch detector 28 and clearing when the most significant byte of a memory reference instruction is detected by block 29. It will be appreciated that generalized status bus 31 shown in FIG. 1 may comprise outputs directly from processor 10 and also comprise outputs from a status latch and a control bus associated with a microprocessor system.

It is to be noted that in a microprocessor based system of any significant size wherein address block decoding is required only the components within dashed block 31 have been added in order to effectuate the present invention. The N replacement bits provided along bus 26 from replacement bits source 17 must be provided to address block decoder 15 in a conventional system. Address block decoder 15 conventionally provides an enable signal on line 16 to ROM 18 in order to operate in a conventional manner. It will therefore be appreciated that if most significant bit bus 20 from the output of ROM 18 were directly connected to most significant bit bus 22 and the components within dashed block 31 removed, the read only memory and microprocessor system of FIG. 1 would be in all respects conventional.

This is pointed out in order to emphasize the simplicity and great utility of the present invention.

Figure 2:
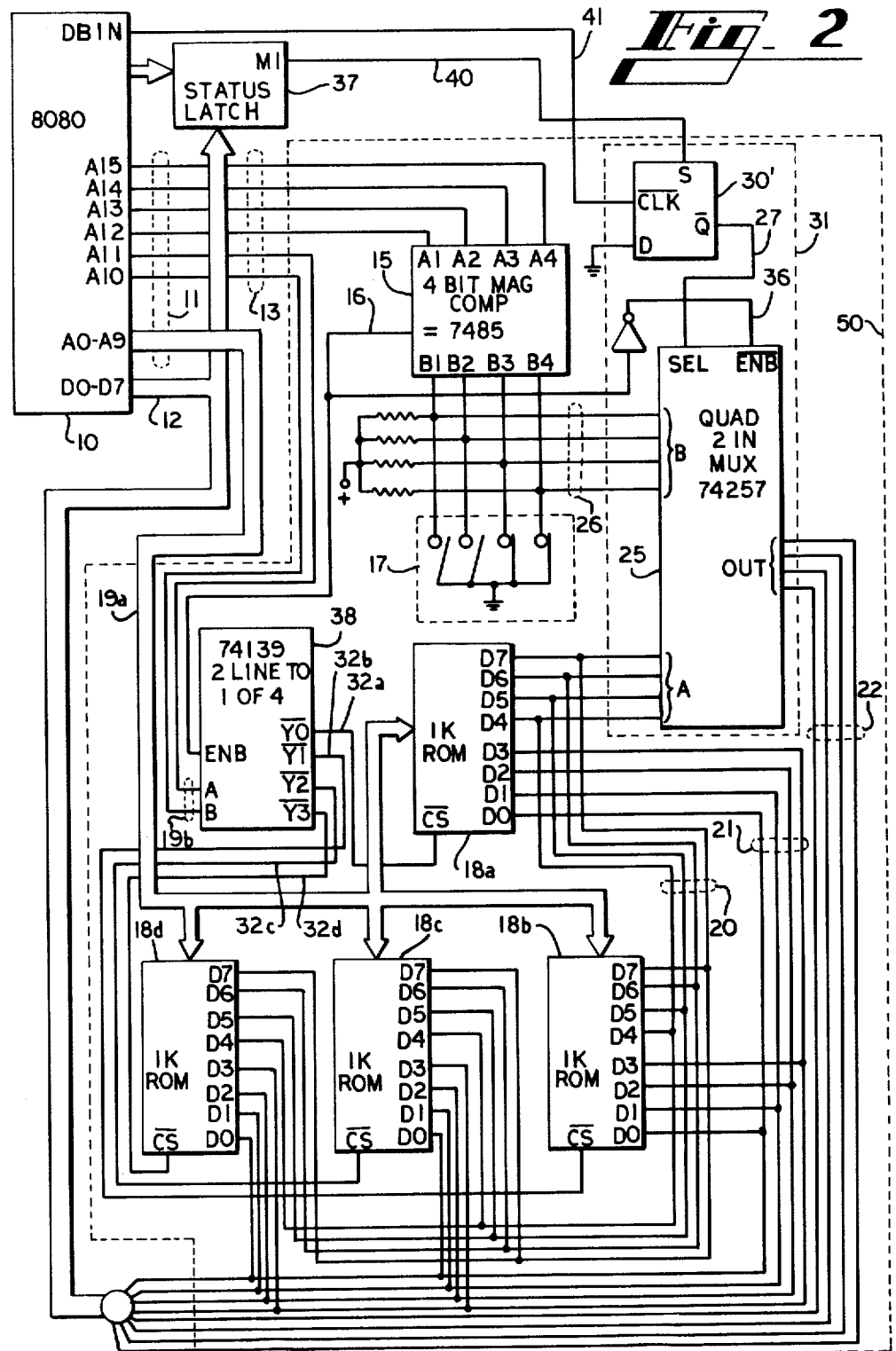
FIG. 2 is a schematic diagram of the preferred embodiment of the present invention as used with a particular commercially available microprocessor.

Turning to FIG. 2 wherein parts which may be identified with a one to one correspondence with referenced elements of FIG. 1 are identified with the same reference numerals, the exemplary preferred embodiment will now be described. Microprocessor 10 is an Intel type 8080 but, as has been mentioned hereinabove, other processors may be used with the present invention. Address bus 11 is identified by a dashed line. The lowest address bits are shown as 19a and 19b in FIG. 2. Address block decoder 15 is embodied at a TTL 7485 four bit magnitude comparator with line 16 being connected to the equal output of said comparator. ROM 18 of FIG. 1 corresponds to 1K ROMs 18a-18d together with two line to one-of-four decoder 38 which decodes the next two most significant bits (A11 and A10) of the address bus in order to select one of the 1K ROMs 18a-18d when enabled by a logical one on line 16.

Most significant bit bus 20 of FIG. 2 is a four bit bus which directly corresponds to bus 20 of FIG. 1 as do four bit buses 21 and 22 of FIG. 2.

Data selector 25 is embodied by a type 74257 quad two input multiplexer having tristate outputs which are controlled by the signal present on line 36. A logical zero on line 36 enables multiplexer 25 and a logical one on line 36 forces bus 22 to a high impedance state. It will therefore be appreciated that when a favorable comparison is detected by address block decoder 15, as evidenced by a logical one on line 16, a logical zero will appear on line 36 and multiplexer 25 will be enabled.

It is also to be appreciated that while not shown in the drawings other devices would be attached to address bus 11 data bus 12 in a microprocessor system employing the present invention.

As may be seen from FIG. 2, replacement bit source 17 is embodied simply as four single pole switches which establish the logical conditions on four bits bus 26 as well as at the B inputs to comparator 15. It will be appreciated that switches 17 define both the block of memory which microprocessor 10 must address in order to access ROMs 18a-18d as well as providing the replacement bits on bus 26.

It will be appreciated by those skilled in the art that switches 17 may be embodied by a plurality of different conventional devices incuding DIP switches, the output of a thumb wheel switch, or hard wired connections.

In the example shown in FIG. 2, switches 17 are set with their two most significant bits equal to zero and their two least significant bits equal to one. Therefore line 16 will be in its logical one state whenever a number 0011XXXXXXXXXXXX is provided on address bus 11. Therefore the block defined by address block decoder 15 is a four K memory block which could also have been determined from inspection of ROMs 18a-18d.

In FIG. 2, a conventional status latch 37 having an output labeled as M1 which appears on line 40 is shown. It will be appreciated by those skilled in the art that status latch 37 is conventionally embodied as a type 8212 latch presently manufactured by Intel Corporation. It will further be appreciated that in a system built using a type 8080 microprocessor line M1 goes high during the machine cycle for which the first fetch to memory for an instruction is made.

Also shown as an output of processor 10 is a DATA BUS IN (DBIN) output which appears on line 41. As will be appreciated by those skilled in the art the DBIN output may be generically referred to as a read strobe and, in the particular processor shown, line 41 will go to a logical one state when processor 10 is reading data from data bus 12.

Turning now to FIG. 3 a timing diagram is provided showing the fetching of a generalized memory reference instruction by microprocessor 10. As was pointed out previously, the environment of the present invention usually requires that the first fetch from memory for an instruction be easily identified. For a system using the 8080 microprocessor, output M1 which appears on line 40 fills this qualification since the output goes high during the first memory fetch for every instruction fetched from memory by the processor. This may be seen from inspection of FIG. 3 wherein M1 is seen to go high at the beginning of the T2 period of the phase one system clock.

The representation of the data bus being in a logical one state during the transition from T1 to T2 is indicative that a status word is present on the bus during this time. It will be appreciated that this status word corresponds to the M1 output about to be latched onto line 40 at the beginning of the T2 period.

As may be seen from FIG. 2, a negative edge triggered D-type flip-flop 30' embodies the generalized latch 30 shown in FIG. 1. It is the combination of the input characteristics of D-type flip-flop 30', the M1 signal on line 40, and the read strobe signal on line 41 for the 8080 microprocessor that fulfill the conditions set forth above for the environment of the present invention.

Since line 40 is connected to the direct set input of flip-flop 30' it will be appreciated that this flip-flop will remain set during the presence of the M1 pulse without regard to the state of the clock input or the D input. As may be seen from FIG. 2 the D input of flip-flop 30' is grounded.

As may be seen from the timing diagram of FIG. 3, the M1 pulse lasts through the first read strobe pulse which appears during clock periods T2 and T3. During these clock periods the first byte of a memory reference instruction is provided onto the data bus. At the end of period T6 a new status word is latched onto status latch 37 and therefore the M1 output on line 40 goes low. During periods T7 and T8 the read strobe on line 41 goes high and, as may be seen from FIG. 3, the second byte of the memory reference instruction is read from the data bus by processor 10.

As has been described hereinabove byte two of the memory reference instruction contains the least significant bits (corresponding to A0-A7) of the memory location reference in the memory reference instruction.

On the falling edge of the read strobe on line 41, flip-flop 30' will be clocked. Since the D input is grounded, flip-flop 30' will clear and a logical one will appear on line 27 to the select input of data selector 25. From FIG. 3, it may be appreciated that, since M1 set the flip-flop prior to byte one of the memory reference instruction being read from the data bus, data selector 25 has had a logical zero on line 27 during the reading of the previous two bytes. It will also be appreciated that upon the falling edge of the read strobe, which occurs in the middle of period T8, the select input to selector 25 becomes logical one. The third and most significant byte of the memory reference instruction appears on the data bus during the portions of periods T10 and T11 shown in FIG. 3.

Applying what is shown in the timing diagram of FIG. 3 to the circuit of FIG. 2, it may be seen that during the reading of the first two bytes of the memory reference instruction from data bus 12, data selector 25 has provided the data present on bus 20 from the output of one of the ROMs 18a-18d to four bit bus 22. During the third fetch from memory (byte three of the memory reference instruction) input B, i.e. bus 26, is provided as the output to bus 22 by data selector 25. Since bus 26 contains the logic state established by switches 17, the four most significant bits of the most significant byte of the memory reference instruction have been modified to correspond to the same four bits which define the memory block through memory block decoder 15. It will therefore be appreciated that any memory reference instruction, such as a JUMP instruction, may be written into ROM 18 in the form JUMP 0000ABC-DEFGHIJKL but will be provided to data bus 12 of processor 10 in the form of JUMP 0011ABCDEFG-HIJKL by the preferred embodiment.

Therefore the program contained within 1K ROMs 18a-18d may be mass produced with all memory reference instructions zero based, that is, having their four most significant bits equal to zero, and yet may be placed in a block of memory, and be treated by processor 10, as containing memory reference instructions having their four most significant bits equal to a number defined by switches 17.

The simplicity and wide applicability of the preferred embodiment of the present invention will thus be apparent.

As may be seen from the right hand portion of FIG. 3, the first memory fetch for the beginning of any instruction causes output M1 to go high thus setting flip-flop 30' and providing the most significant bits from the outputs of ROMs 18a-18d appearing on bus 20 to bus 22. Therefore, if processor 10 is executing a sequence of two byte instructions flip-flop 30' will remain set. Other three byte instructions will not reference memory and will not affect operation of the processor.

It should be further appreciated that the simplicity of using a negative edge triggered D-type flip-flop 30' with the 8080 processor in order to control the select input of data selector 25 should not disguise the general nature of flip-flop 30' as a counter for counting the number of memory fetches for a particular instruction. Inspection of FIG. 3 will show that the available outputs for the 8080 microprocessor 10 cause flip-flop 30' to remain set during the first two fetches evidenced by the first two read strobes on line 41. The flip-flop clears at the end of the second fetch (the falling edge of DBIN) in period T8 and will remain cleared if a third fetch occurs (thus providing the replacement bits to bus 22), or will be set once again by the next occurrence of an M1 output indicating the first memory fetch of another instruction.

Therefore any device which will detect the first occurrence of a memory fetch for an instruction, and which will thereafter count memory fetches during that same instruction and change the state of a particular output when the Mth fetch for that instruction takes place, will be the equivalent of flip-flop 30' shown in FIG. 2.

Note on FIG. 2 that the apparatus enclosed within block 31 corresponds to the apparatus enclosed within block 31 in FIG. 1 and, as explained previously, the remaining apparatus shown in FIG. 2 would be required of a conventional system. Therefore the very slight increase in cost in order to construct an embodiment of the present invention for use in a microprocessor based system will be appreciated since data selector 25 is available conventionally as a single MSI integrated circuit package and flip-flops for flip-flop 30' are available several to the package. It will be appreciated that the elements enclosed by dashed line 50 are the components which will be used on a 4K memory "card" embodying the present invention.

Therefore the present invention may be embodied very conveniently on a card containing 4K of read only memory but can greatly increase the versatility and variety of mass produced ROMs which may be placed in the locations of ROMs 18a-18d.

It will also be appreciated that, in view of the foregoing disclosure, other embodiments of the present invention and particularly other embodiments using other processors may be constructed and that the preferred embodiment disclosed herein has been by way of example only. Therefore the present invention should be limited in scope only by the claims below.

I claim:

1. In a read only memory, adapted to be used with an L-bit byte, byte oriented processor, said processor being characterized by a data bus for at least presenting outputs from said memory to an address register in said processor, by an instruction set including memory reference instructions of M bytes requiring M fetches to memory wherein the Mth fetched byte of each of said memory reference instructions is a most significant byte, L and M being positive integers, said processor providing predetermined status signals, the improvement comprising:

location means for providing N replacement address bits, N being an integer greater than zero and less than or equal to a L;

means responsive to said status signal for providing a most significant byte signal in response to an Mth fetch of a said memory reference instruction; and data selector means for providing said N replacement bits to lines of said data bus in response to said most significant byte signal.

2. A read only memory as recited in claim 1 further comprising an address decoder for comparing N address bits from said processor which appear on an address bus to said N replacement bits from said location means including means for providing a memory enabling signal when said N adress bits bear a predetermined relationship to said N replacement bits.

3. A read only memory as recited in claim 2 wherein said location means comprises a plurality of switches.

4. A read only memory as recited in claim 1 including means for connecting said data selector means to said data bus to provide said N replacement bits to the N most significant bit lines of said data bus.

5. In a memory apparatus for use with an L bit byte, byte oriented processor having an instruction set characterized by M byte memory reference instructions wherein the Mth byte of said memory reference instruction is the most significant byte of the memory reference of said memory reference instruction, said processor including an address bus and a data bus for at least presenting output signals from said memory apparatus to an address register in said processor, M and L being integers, the improvement of:

a set of switches for establishing a set of N block location bits, N being an integer greater than zero and less than or equal to L;

a N bit address block decoder for providing an enable signal in response to a predetermined set of address bits from said processor which appear on said address bus which bear a predetermined relationship to said block location bits;

said memory apparatus including means for operatively connecting to said address bus in response to said enable signal;

control means for providing a first select signal upon each occurrence of a first memory fetch of a said memory reference instruction from said processor and for providing a second select signal in response to each occurrence of an Mth memory fetch of a said memory reference instruction from said processor; and data selector means for providing N bits of an output from said memory apparatus to N lines of said data bus in response to said first select signal and for providing said N block location bits to said N lines of said data bus in response to said second select signal.

6. A memory apparatus as recited in claim 5 wherein said memory is a read only memory.

* * * * *